Nov. 25, 1930.　　　　S. L. LEBBY　　　　1,782,732

COVER GLASS

Filed March 13, 1929

INVENTOR
STATES LEE LEBBY.
BY
ATTORNEYS

Patented Nov. 25, 1930

1,782,732

UNITED STATES PATENT OFFICE

STATES LEE LEBBY, OF CORNING, NEW YORK, ASSIGNOR TO CORNING GLASS WORKS, OF CORNING, NEW YORK, A CORPORATION OF NEW YORK

COVER GLASS

Application filed March 13, 1929. Serial No. 346,755.

This invention relates to lenses and more particularly to lenses for use in signalling wherein it is desirable to secure a wide spread of the beam of light from a projector.

In the most common type of spread-light lenses, it is customary to provide a plate of transparent material such as glass with parallel flutes which form light refracting members and cause the light rays issuing from the projector to bend outwardly and spread over a relatively wide area in one plane.

Owing to the concave shape of the flutes used, sharp angles are formed between them which make the article hard to produce as it is apt to cause checking. On the other hand, should an attempt be made to produce convex refracting members, the mold equipment must be formed with sharp edges which are subject to rapid erosion.

The primary object of the present invention is to alter the characteristics of a beam of light from a projector so as to spread it over an exceedingly wide area in one plane, and to facilitate the production of lenses capable of spreading the beam beyond a total of sixty (60°) degrees.

A secondary object is to unsymmetrically distribute a projected beam so that its field of greatest intensity is to one side of the longitudinal axis of the projector and diminishes toward the opposite side.

Among its features the invention embodies a lens provided on one face with a series of parallel light deflecting members one side of each of which is substantially convex while the opposite side is substantially concave.

Another feature is the modification of one or both sides of each light deflecting member to produce the desired distribution of light intensity in the spread beam.

Figure 1:
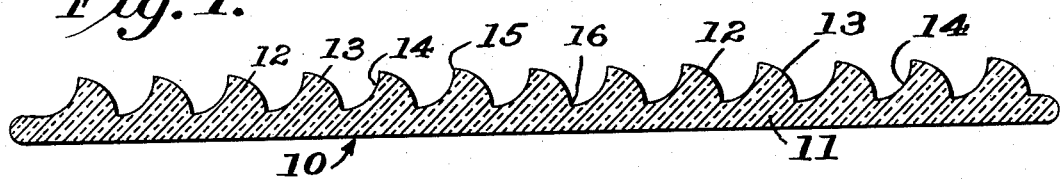
Fig. 1 is a horizontal sectional view through a lens constructed in accordance with this invention.
Figure 2:
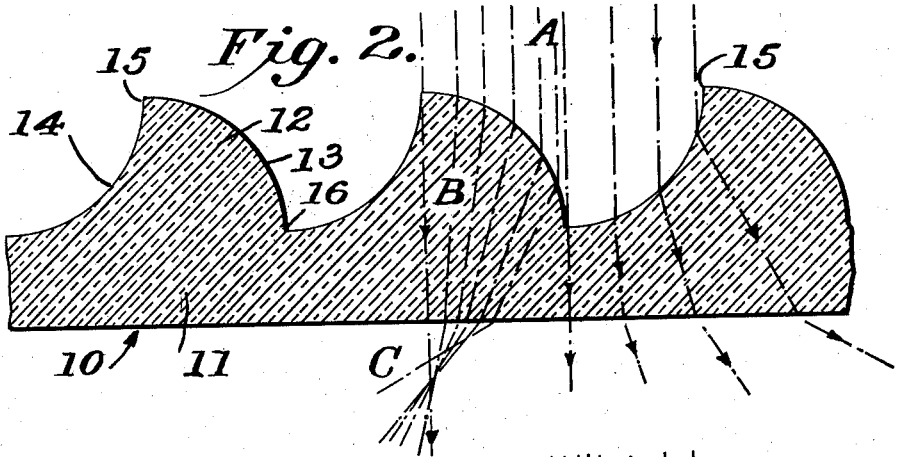
Fig. 2 is a fragmentary sectional view on a greatly enlarged scale showing in detail the light deflecting members and the bending of the light rays which takes place as they pass through the lens.

The lens 10 is best shown in Figs 1 and 2 and comprises a body 11 of transparent material which in the present illustration is shown as being flat, though it is to be understood that it may be made convex without departing from the scope of the invention. Formed on the inner side of the lens are light refracting members 12, each of which is provided with a convex side 13 and a concave side 14 which joins the outer edge of the convex side 13 at 15 forming an obtuse angle which eliminates sharp edges on the light refracting member. The concave side 14 extends from the point 15 where it joins the convex side 13, of its light refracting member, to a point 16 where it joins the convex side of the next adjacent light refracting member 12, there likewise forming an obtuse angle. It is important that the convex and concave sides of the light refracting members form an obtuse angle at their junction points so that no sharp edges need be produced either in the ware, or the mold equipment used in its production. In order to secure full light distribution over the face of the lens and prevent the introduction of dark areas thereon, I have found it necessary to end the convex and concave sides 13 and 14 where light passing through their terminals will be normal to them and to the front face of the lens.

Figure 3:
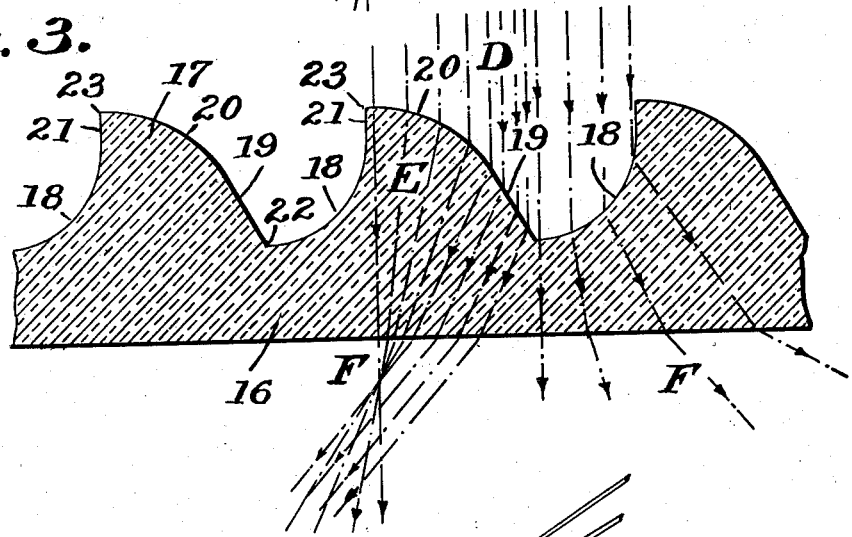
Fig. 3 is a view similar to Fig. 2 illustrating in detail a modification of the light refracting members.

In the modified form of my invention shown in Fig. 3, the lens 16 is shown as being provided with light refracting members 17 each of which is provided with a concave side 18, and a flat side 19 which extends tangentially with and merges into a convex surface 20. The inner edge of the flat side 19 joins the inner edge of the concave side 18 of the next adjacent light refracting member 17 at an obtuse angle thereby eliminating sharp edges, and the curved surface 20 extends from the outer edge of the flat side 19 to the outer edge of the concave side 18. While the construction may be used when the concave side 18 is of equal or less curvature than the convex surface, it will be seen that when the curvature of the concave side is greater than that of the convex side, as shown in Fig. 3, it becomes necessary to interpose a flat surface 21 which extends tangentially from the outer end of the concave side 18 to a point 23 where it joins the outer edge of the convex surface 20, it being understood that since the flat surface 21 lies parallel with the light rays no refraction will be produced by this area.

To secure a continuous beam throughout the entire angle of spread, the intersections 22 of the concave side 18 with the flat side 19, and the intersections 23 of the flat surface 21 with the convex surface 20 should be at or slightly beyond the points where light passing through them will be normal to them and to the front face of the lens. By thus preserving the relation of the points of intersection 22 and 23 with the front face of the lens, it becomes apparent that the construction of the refracting members as herein described may be adapted for use with either flat or convex lenses.

In using a lens wherein the light refracting members are constructed as illustrated in Figs. 1 and 2, parallel, light rays A falling upon the convex and concave sides 13 and 14 of the light refracting members 12 will be directed through the glass as at B and finally emerge as at C with substantially uniform intensities until the extreme spread angles at each side are reached. When the type of lens illustrated in Fig. 3 is used, parallel light rays D, falling on the concave sides 18 and the convex curved surfaces 20 of the light refracting members 17, will be directed through the glass as at E and emerge therefrom as at F with substantially uniform intensity until the extreme spread angles of the concave sides 18 are reached. Since the extreme spread angles of each light refracting member are positioned to direct the light falling thereon to the same side of the lens, it becomes evident that the beam intensity diminishes toward that side. The beam intensity on the opposite side of the lens, however, is increased through the use of the flat sides 19 of the light refracting members which, while producing a relatively wide spread of the beam, avoid the extreme spread angles and hence preserve their light transmitting qualities.

Figure 4:
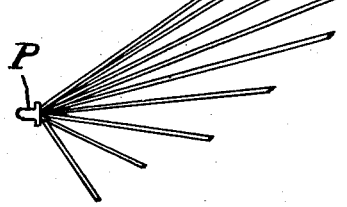
Fig. 4 is a top plan view of a projector equipped with my improved lens having the modified form of light deflecting members, and showing diagrammatically the unsymmetrical light distribution produced thereby, the length of the lines representing the relative light intensity.

In this manner I am enabled to build up a spread beam having its highest intensity on one side of its axis and with diminishing intensities toward the opposite side. Such a beam is illustrated in Fig. 4, wherein the length of the lines radiating from the projector P indicate the relative intensity of the different portions of the beam.

While in the foregoing I have set forth only two examples of my invention, it is to be understood that minor changes in the details of construction, combination, and arrangement of parts may be resorted to, such as arranging the refracting flat sides at the outer ends of the concave sides, without departing from the spirit and scope of my invention as claimed.

I claim:

1. A cover glass comprising a transparent plate, and parallel light refracting members on said plate, each of said light refracting members being divided midway of its width into parallel light refracting surfaces of opposite curvature.

2. A cover glass comprising a transparent plate, and parallel light refracting members on said plate, each of said light refracting members being divided midway of its width into parallel light refracting surfaces of opposite curvature, the points of intersection of the curved surfaces forming obtuse angles.

3. A cover glass comprising a transparent plate, and parallel light refracting members on said plate, each of said light refracting members being divided longitudinally into light refracting surfaces of opposite curvature, and flat surfaces extending tangentially from certain of the curved surfaces to produce different intensity of light distribution in predetermined regions.

4. A cover glass comprising a transparent plate, and parallel light refracting members on said plate, one side of each light refracting member being substantially concave, the opposite side of each light refracting member having a convex portion and a flat face extending tangentially therefrom.

STATES LEE LEBBY.